(12) United States Patent
Kempen et al.

(10) Patent No.: US 9,396,837 B2
(45) Date of Patent: Jul. 19, 2016

(54) ELECTRICAL CONDUCTION DEVICE, OVERHANG CORONA SHIELDING ARRANGEMENT AND METHOD FOR PRODUCING AN OVERHANG CORONA SHIELDING

(75) Inventors: Stefan Kempen, Arnsberg (DE); Steffen Lang, Hallerndorf (DE)

(73) Assignee: Siemens Aktiengesellschaft, Munich (DE)

( * ) Notice: Subject to any disclaimer, the term of this patent is extended or adjusted under 35 U.S.C. 154(b) by 176 days.

(21) Appl. No.: 14/345,239

(22) PCT Filed: Sep. 3, 2012

(86) PCT No.: PCT/EP2012/067127
§ 371 (c)(1),
(2), (4) Date: Mar. 21, 2014

(87) PCT Pub. No.: WO2013/041359
PCT Pub. Date: Mar. 28, 2013

(65) Prior Publication Data
US 2014/0345907 A1    Nov. 27, 2014

(30) Foreign Application Priority Data
Sep. 22, 2011   (DE) .......................... 10 2011 083 214

(51) Int. Cl.
*H01B 1/02* (2006.01)
*H01B 3/02* (2006.01)
*H01B 3/04* (2006.01)
*H01B 3/10* (2006.01)
(Continued)

(52) U.S. Cl.
CPC ................ *H01B 5/004* (2013.01); *H01B 1/026* (2013.01); *H01B 3/02* (2013.01); *H01B 3/04* (2013.01); *H01B 3/10* (2013.01); *H01B 5/02* (2013.01); *H01B 7/29* (2013.01); *H01B 13/22* (2013.01); *H02K 3/40* (2013.01); *H02K 15/105* (2013.01)

(58) Field of Classification Search
None
See application file for complete search history.

(56) References Cited

U.S. PATENT DOCUMENTS 2,061,502 A    11/1936    Calvert
3,066,180 A    11/1962    Kelen
(Continued)

FOREIGN PATENT DOCUMENTS

CN    1437786 A    8/2003
DE    1160938 B    1/1964
(Continued)

OTHER PUBLICATIONS

W.P. Schmidt et al.: "Umweltverträgliche Harzimprägnierung elektrischer Maschinen mittels Stromwärme", Bundesministerium für Verkehr, Innovation und Technologie, Berichte aus Energie- und Umweltforschung, 62/2006; (English Abstract Attached).

*Primary Examiner* — Jeremy C Norris
*Assistant Examiner* — Muhammed Azam
(74) *Attorney, Agent, or Firm* — Beusse Wolter Sanks & Maire

(57) ABSTRACT

An electrical conduction device is provided having an electrically conductive conduction element and an electrically insulating sheathing surrounding said conduction element at least in regions. An overhang corona shielding in the form of a coating composed of a material having a resistivity that increases towards an end of the sheathing is arranged on the sheathing at an outer side. An overhang corona shielding arrangement and a method for producing an overhang corona shielding are also provided.

19 Claims, 3 Drawing Sheets

(51) Int. Cl.
  *H02K 3/40* (2006.01)
  *H01B 5/00* (2006.01)
  *H01B 5/02* (2006.01)
  *H01B 7/29* (2006.01)
  *H01B 13/22* (2006.01)
  *H02K 15/10* (2006.01)

(56) References Cited

U.S. PATENT DOCUMENTS

| | | | |
|---|---|---|---|
| 4,576,827 A * | 3/1986 | Hastings | B05B 5/001 239/3 |
| 5,921,285 A * | 7/1999 | Quigley | D04C 1/06 138/114 |
| 6,329,741 B1 * | 12/2001 | Vartuli | H01L 41/0926 310/330 |
| 6,395,149 B1 | 5/2002 | Palmgren | |
| 2005/0133720 A1 | 6/2005 | Russel et al. | |
| 2008/0210453 A1 * | 9/2008 | Kauffman | H01B 3/308 174/110 R |
| 2008/0236874 A1 * | 10/2008 | Khaselev | H01B 1/02 174/257 |

FOREIGN PATENT DOCUMENTS

| | | |
|---|---|---|
| DE | 1540079 A1 | 1/1970 |
| DE | 10227226 A1 | 1/2004 |
| EP | 1243063 A1 | 9/2002 |
| EP | 1995850 A1 | 11/2008 |
| EP | 1995850 B1 | 6/2010 |
| EP | 2362399 A1 | 8/2011 |
| FR | 1418779 A | 11/1965 |
| JP | S5683238 A | 7/1981 |
| JP | S5691637 A | 7/1981 |
| JP | S5683238 A | 8/1983 |
| JP | S5814451 A | 8/1983 |
| JP | S58144551 A | 8/1983 |
| JP | S59226641 A | 12/1984 |
| JP | S6122733 A | 1/1986 |

* cited by examiner

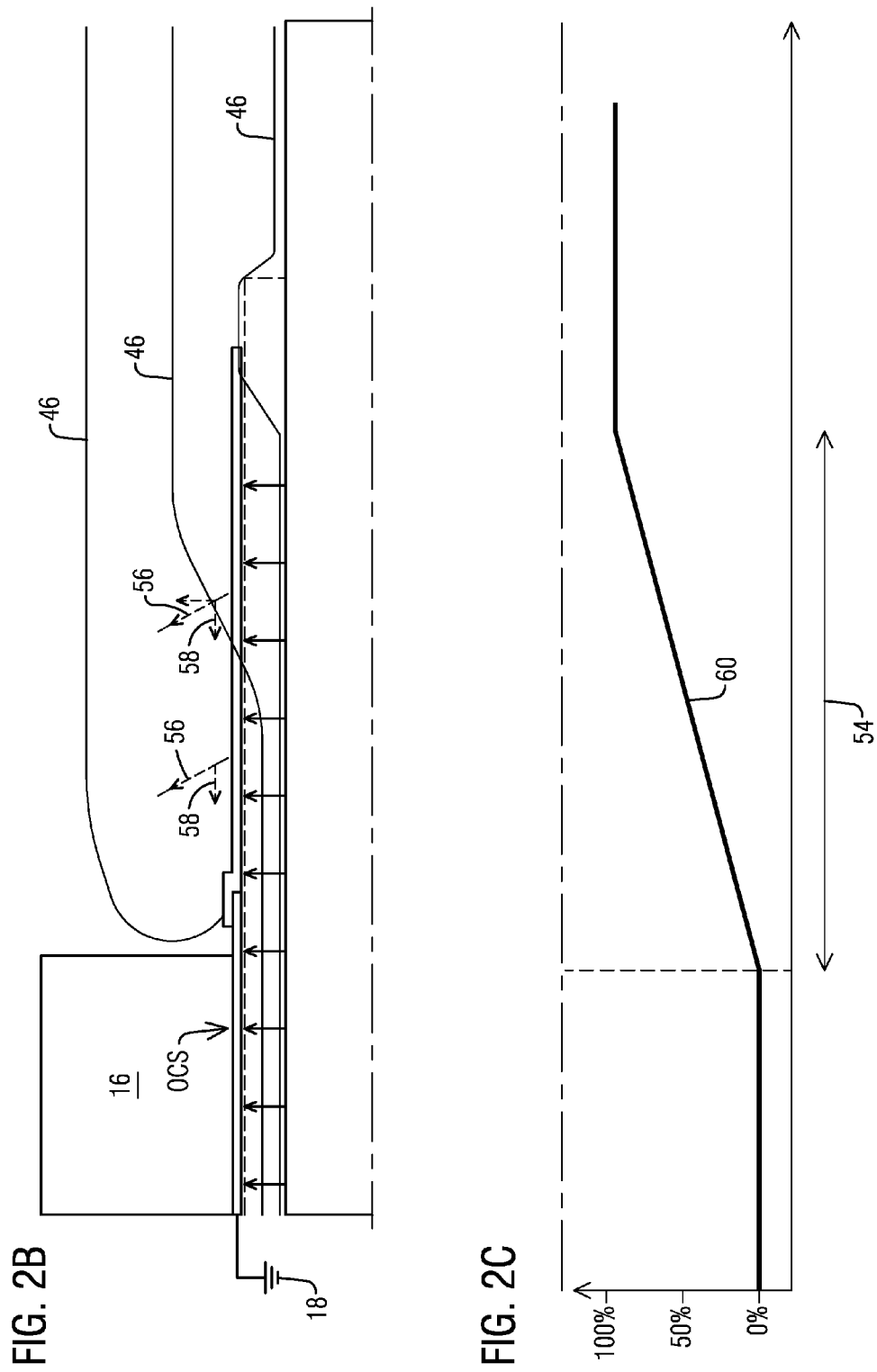

ELECTRICAL CONDUCTION DEVICE, OVERHANG CORONA SHIELDING ARRANGEMENT AND METHOD FOR PRODUCING AN OVERHANG CORONA SHIELDING

CROSS REFERENCE TO RELATED APPLICATIONS

This application is the US National Stage of International Application No. PCT/EP2012/067127 filed Sep. 3, 2012, and claims the benefit thereof. The International Application claims the benefit of German Application No. DE 102011083214.9 filed Sep. 22, 2011. All of the applications are incorporated by reference herein in their entirety.

FIELD OF INVENTION

The invention relates to an electrical conduction device comprising an electrically conductive conducting element, for example a copper bar, and an electrically insulating sheath surrounding this conducting element at least regionally. End corona shielding is provided on an outer side of the sheath at one end. The invention also relates to a flat end corona shielding arrangement for an electrical conductive device and to a method for producing end corona shielding for an electrically insulating sheath of an electrical conducting element.

BACKGROUND OF INVENTION

End corona shielding of the mentioned type is known from EP 2 362 399 A1, for example.

In the case of electrical operating means with a high electrical rated voltage, in particular a rated voltage of above 5 kV, live conductor bars, for example, need to have electrical insulation which is shielded from cavities and detachments by an inner and an outer conducting layer. Examples of such electrical operating means are electric generators, electric motors, transformers, bushings and electrical cables.

The conducting layers mean that an irregular distribution of the electrical field strength within the main insulation and thus partial discharges which can destroy the main insulation are avoided. The inner conducting layer located between the main insulation and the conductor bar is also referred to as inner potential grading (IPG). The outer conducting layer located on an outer side of the main insulation is also referred to as outer corona shielding (OCS). The electrical field emanating from the electrical conductor bar is reduced in the main insulation starting from the IPG in the radial direction up to the OCS.

In order to be able to connect a conductor bar of an operating means to a further electrical arrangement, the insulation needs to be stripped from one bar end. In other words, it is not possible to control the electrical field by means of the IPG, the main insulation and the OCS over its profile in a desired manner at one bar end. The problems occurring in this connection will be explained in more detail below with reference to FIGS. 1A-1C. FIG. 1A shows a bar end 10 of a generator winding bar 12 in the region of an exit point 14 of the winding bar 12 from a stator laminate stack 16 of an electrical generator for a high voltage. Outer corona shielding OCS which is electrically connected to a ground potential 18 ends at the exit point 14. Main insulation 20 is continued in the direction of a region 22 of the winding bar 12, in which region the insulation has been stripped.

This arrangement shown in FIG. 1A represents a typical sliding arrangement which can be provided not only in the case of generators, but also in electric motors, transformers, bushings and cables. FIG. 1B shows, in relation to the arrangement of FIG. 1A, equipotential lines 24 of an electrical field and lines of force 26 running perpendicular thereto. The electric field surrounds the live winding bar 12. In the case of the electrical field, the lines of force also have a strong nonlinear tangential component 30, in each case in addition to a radial component 28, in the exit region 14 at the end of the outer corona shielding OCS. Owing to a very dense profile of the equipotential lines 24 at one edge 32 of the outer corona shielding OCS, a magnitude of the electrical field strength is at its greatest there. A very low corona inception voltage results here. Therefore, undesired creeping discharges occur again and again in the region of the edge 32.

FIG. 1C illustrates a profile 37 of an electrical potential as results on an outer surface 34 of the main insulation 20 along a longitudinal direction of extent 36 of the winding bar 12.

In the region of the edge 32, the potential increases from ground potential (0% of the potential of the winding bar 12) in a region of a few millimeters to 100% of the potential of the winding bar 12. In other words, over this comparatively small path region, there is a voltage drop of 5 kV or more.

In order to prevent partial discharges at the edge 32, further outer corona shielding can be provided which surrounds the main insulation 20 on the other side of the exit point 14 as well. This outer corona shielding is then referred to as end corona shielding or cable end seal. Such end corona shielding comprises a resistive potential grading or field control, i.e. end corona shielding has a higher electrical resistance than an OCS. End corona shielding can be produced by a partially conductive enamel or a partially conductive banding on the basis of silicon carbide or another electrically semiconductive filler. Partial conductivity is in this case understood to mean a conductivity which is less than that of a metallic conductor and greater than that of an electrical insulator. The aim of such potential grading is to obtain a less steep profile of the surface potential of the main insulation 20.

Until now, it has been known in this regard to surround the surface 34 of a main insulator 20 beyond the edge 32 of the outer corona shielding OCS with a semiconductive enamel or a semiconductive banding (W. P. Schmidt et al.: "Umweltverträgliche Harzimprägnierung elektrischer Maschinen mittels Stromwärme" [Environmentally sound resin impregnation of electric machines by means of Joulean heat], German Federal Ministry for Transport, Innovation and Technology, reports from energy and environmental research, 62/2006). However, it is necessary that a resistance of the end corona shielding surrounding the main insulation 20 increases from the edge 32 to the region 22, from which the insulation has been stripped, of the winding bar 12. Otherwise, an arc can form between the end corona shielding and the region 22. In order to predetermine the electrical resistance of the end corona shielding along the direction of extent 36, a partially conductive enamel can be applied in a plurality of layers. The layers in this case extend over different distances along the direction of extent 36. The layer arrangement thus produced therefore has a variable thickness along the direction of extent 36. Correspondingly, provision can be made for the end corona shielding to be provided by a plurality of partially conductive bandings and in the process for the bandings to be wound more thickly in the region of the edge 32 than close to the region 22 from which the insulation has been stripped. The locationally dependent resistance is in both solutions achieved, therefore, by a correspondingly predetermined line cross section of the enamel layers or the bandings.

One disadvantage with these solutions is that transition points result in the region of the end corona shielding, i.e.

either transitions between the enamel layers or between individual plies of the bandings. Then, an excessive increase in the field strength can occur here, as a result of which partial discharges can arise within the end corona shielding as well.

SUMMARY OF INVENTION

An object of the present invention includes providing end corona shielding with a high dielectric strength.

This object is achieved by an electrical conducting device, an end corona shielding arrangement and a method in accordance with the independent claims. Advantageous developments of the invention are set forth in the dependent claims.

The electrical conducting device according to aspects of the invention comprises an electrically conductive conducting element, i.e., for example, a conductor bar comprising copper, and an electrically insulating sheath which surrounds this conducting element at least regionally, such as, for example, the main insulation in the case of a conductor bar. End corona shielding in the form of a coating comprising a material which has a resistivity which increases towards one end of the sheath is arranged on an outer side of the sheath. The end of the sheath can represent a transition to a region from which the insulation has been stripped, for example.

In other words, the material is inhomogeneous in relation to its resistivity. Instead, provision is made for a composition of the material to be locationally dependent, which results in an electrical resistivity which is locationally dependent. If, therefore, the electrical resistance of small volume elements of the coating is measured, i.e., for example, in each case a cubic millimeter of the coating, at different points in the coating, a greater resistance value results in this case for volume elements which are located closer to the end of the sheath than for those volume elements which are located at a greater distance from the end of the sheath. This measurement described here in this case assumes that the resistance of all of the volume elements with the same electrical voltage, i.e. with the same electrical field strength, is measured. By way of summary, the resistance per path section in the case of the coating of the conducting device according to the invention therefore increases not owing to a changing layer thickness of a multi-ply enameling or banding, as is the case in the prior art, but owing to its locationally dependent resistivity.

This results in the advantage that the end corona shielding formed by the coating does not have any layer transitions, edges or material transitions at which an excessive increase in field intensity and therefore a partial discharge could result.

In connection with the electrical conducting device according to aspects of the invention, a conducting element is understood to mean an electrically conductive element, such as, for example, a rod comprising copper or aluminum, a wire or a busbar, which is live and conducts current during operation of the conducting device. An electrically insulating sheath can be provided, for example, by main insulation comprising a polymer or mica.

A particularly advantageous embodiment of the conducting device according to aspects of the invention provides for the resistivity of the coating to increase towards the end of the sheath in accordance with a continuously differentiable function from an initial value to a final value. In other words, the value of the resistivity along the direction of extent of the coating towards the end of the sheath does not change suddenly. This has proved to be particularly advantageous for avoiding excessively high field intensities. It is very particularly advantageous in this case if the value of the resistivity increases in accordance with a straight line towards the end of the sheath. This advantageously results in an electrical field strength along the entire region in which the resistivity increases in accordance with the straight line having, on the surface of the coating, an electric field strength whose tangential component parallel to the surface of the sheath is constant.

The coating with the resistivity which increases towards one direction can be provided in a variety of ways. Thus, it is possible to form the coating by means of a plate which comprises an electrically insulating material, for example a metal oxide, and whose locationally dependent conductivity has been produced by doping. If a degree of doping is selected in locationally dependent fashion, a correspondingly locationally dependent resistivity can be set on the plate. Another possibility of producing a coating with a locationally dependent resistivity includes impregnating a banding with a plurality of enamels whose conductivity differs. By impregnating different regions of the banding with different partially conductive enamels, overall a single-ply banding can be provided whose resistivity is likewise locationally dependent.

A very particularly preferred embodiment of the conducting device according to aspects of the invention, however, envisages that the material of the coating comprises particles with a first electrical conductivity and particles with a lower second electrical conductivity. The increase in the resistivity towards the end of the sheath is in this case effected by virtue of a concentration of those particles which have the first, higher conductivity which decreases towards the end being provided. At the same time, a concentration of those particles which have the second, lower conductivity, i.e. the higher resistance, increases towards the end of the sheath. Therefore, the material represents a dispersion which comprises at least the two sorts of particles. This results in the advantage that the local profile of the resistivity can be set easily by controlling the concentrations of the two sorts of particles during coating. In this case, only two sorts of particles are required, and nevertheless an ungraduated increase in the resistivity can be achieved. In this case, a concentration of the particles is intended to mean the particle density of said particles in the material of the coating.

A total content of the particles is in this case preferably at least so great in the material that a percolation threshold is exceeded, i.e. it is always possible for current paths to form from a rim of the coating, which rim faces the end of the sheath, to a rim of the coating opposite this via the particles. Then, a fluctuation in the total content brought about by manufacturing tolerances only has an insubstantial effect on the conductivity.

A further embodiment of the conducting device according to aspects of the invention envisages that the material of the coating comprises an electrically insulating substance, wherein a matrix in which electrically conductive particles are arranged is formed by the substance. It has proven to be particularly suitable here to use a polymer, preferably a synthetic resin or enamel. It is possible by means of such a matrix substance to apply the electrically conductive particles as a suspension in a liquid state of the substance to the sheath. This makes the production of the coating simple even when the sheath has an irregular shape.

For the case in which the material of the coating comprises electrically conductive particles with different electrical conductivity, a further advantage results when these particles have the same shape and/or the same chemical constituents. Then, the particles can be processed in the same way irrespective of their respective electrical conductivity. Particles of this nature can be provided, for example, by virtue of the fact that the particles are produced on the basis of identical electrically insulating base bodies, which are then coated with layers of different conductivity. Correspondingly, a development of the conducting device according to the invention envisages that the electrically conductive particles are each formed from a base body which has a layer comprising a doped metal oxide. Mica can be used as the base body, for example. A metal oxide, for example tin oxide, can be used as the coating for the base body. For the doping, antimony can be used, for example. The conductivity of a particle can be adjusted by the degree of doping. Particles of this nature and a method for producing same are described in the document EP 2 362 399 A1 mentioned above. The use of mica in this case results in the advantage that the particles formed therefrom have a comparatively low abrasiveness and can therefore easily be sprayed onto the sheath by means of a nozzle in the form of a particle/enamel suspension in order to obtain the coating.

By changing the particle density of the individual particles in a matrix, locational dependency of the mechanical material property of the coating can be provided. This is advantageously avoided if, in the case of the material of the coating, a particle-to-mass concentration is constant.

Another development of the conducting device according to aspects of the invention envisages that, in the material of the coating, electrically conductive particles are provided with a flattened shape. It is possible, for example, to use plate-shaped particles with a thickness of between 250 nm and 350 nm and edge lengths in the range of from 10 μm to 20 μm. Flat particles result in the advantage that they can be shifted against one another in the coating (for example during curing of a liquid carrier matrix) without electrical conducting paths being interrupted hereby. In contrast to this, globular or spherical particles have the disadvantage that they only make point touching contact and therefore an electrical conducting path is interrupted in the case of a small relative shift thereof. Flat particles in addition have the advantage that they separate more slowly in a suspension. Thus, a more uniform distribution of the particles within the coating can be achieved.

The field control effected by the end corona shielding has the effect that an alternating current is brought about in the coating by an alternating electrical field which typically emanates from the conducting element (for example on a 50 Hz or 60 Hz AC mains voltage), and this alternating current needs to be dissipated from the coating to a ground potential. This alternating current should be as low as possible in order to keep electrical losses of the conducting device low. A development of the conducting device according to the invention envisages that a sheet resistance of the coating at a rim of the coating which is remote from the end of the sheath is between 8000Ω and 12000Ω, in particular 10000Ω. Another conventional notation for the unit of sheet resistance is in this case $\Omega_\square$. Preferably, in this case an opposite rim of the coating, which faces the end of the sheath, has a resistivity which corresponds to the resistivity of a material of the insulating sheath itself. Such a coating has proven to be particularly favorable for obtaining the desired potential profile, which falls away linearly along the coating, on the surface of said coating in the case of low discharge currents.

In the case of the conducting device according to aspects of the invention, it is particularly advantageous if the coating is formed from a single-ply layer. This enables improved heat dissipation from the electrical conducting element in comparison with the generally multi-ply end corona shielding arrangements as are formed in accordance with the prior art by applying a partially conductive enamel with a number of plies or by multiply wrapping with partially conductive bandings.

In the case of the coating for the sheath of the conducting device, it is not necessary for the coating to first be present in liquid form in order to be able to be applied to the sheath once the sheath has been manufactured. It is also possible to produce end corona shielding in accordance with the invention in the form of an electrically conductive film or banding with locationally dependent resistivity, for example, and to arrange the film or banding to the sheath afterwards. In this connection, a further aspect of the invention envisages an end corona shielding arrangement for an electrical conducting device which comprises a layer which extends (for example in the form of a film) flat along a direction of extent and in the process has a resistivity which increases along the direction of extent in accordance with a monotonically increasing function. This arrangement, as has already been mentioned, can be provided as a film or banding, for example, which can then be adhesively bonded to the sheath of the conducting element, i.e. to the insulation, as coating, for example. The end corona shielding arrangement according to the invention has the advantage that the layer can be produced in a separate production step and only needs to be applied afterwards as coating to the sheath. One possibility of providing such an end corona shielding arrangement includes spreading or spraying with the enamels already described.

A third aspect of the invention relates to a method for producing end corona shielding for an electrically insulating sheath of an electrical conducting device. In accordance with this method, end corona shielding can be provided on the basis of particles of at least one sort, wherein the particles of one sort have an identical predetermined electrical conductivity. When mention is made here to "identical" conductivity of the individual particles, two particles are also considered to have identical conductivity if their conductivities only differ by a tolerance value determined by the production process for these particles. In accordance with the method according to the invention, a spray jet comprising an enamel and these particles is produced by means of a nozzle arrangement, which is moved in the meantime along a surface of the insulating sheath of the conducting device. During the movement of the nozzle arrangement, a concentration of the particles of at least one sort in the spray jet is changed.

The method according to the invention has the advantage that, on the basis of said method, end corona shielding with locationally dependent resistivity can be produced easily to a large extent independently of the shape of the sheath.

A development of the method envisages that a first sort of particles and a first proportion of the enamel are provided as a first suspension and a second sort of particles and second proportion of the enamel are provided as a second suspension. The two suspensions can thus be sprayed onto the sheath via separate nozzles. The two suspensions are in this case mixed by means of the two nozzles of the nozzle arrangement in the spray jet or on the sheath. This development has the advantage that, in order to adjust the concentration of the particles of one sort, only a nozzle pressure of the corresponding nozzle needs to be controlled in a simple manner.

Another embodiment of the method envisages that at least two different particle/enamel suspensions are mixed in a common nozzle of the nozzle arrangement. In this connection, the nozzle is also understood to mean the feedline system thereof. Such a nozzle is also referred to as an in-situ mixer. In the case of such a mixer, the concentration of the different particles can be achieved by mixing the respective liquid suspensions. The mixing is in this case advantageously very uniform and can be provided using a nevertheless comparatively simple arrangement.

In the case of the coatings known from the prior art for end corona shielding, the corresponding enamel or the banding is applied by hand by a person skilled in the art with special training for this purpose. This ensures that, in a series of generators, the end corona shielding arrangements of said generators have as similar electrical properties as possible. In a development of the method according to the invention for producing end corona shielding, provision is made for the described nozzle arrangement to be moved by a robot. In test series, it has been shown that, as a result, the coating can be applied up to 50% more quickly than is possible using a person skilled in the art. Nevertheless, when using a robot, a uniform coating with the desired electrical properties can be provided.

Developments of the end corona shielding arrangement which correspond to the described developments of the conducting device according to the invention are also included in the invention. Likewise, the invention includes developments of the method according to the invention which correspond to the described developments of the conducting device according to the invention. These developments of the end corona shielding arrangement according to the invention and of the method according to the invention are therefore not described separately here again.

BRIEF DESCRIPTION OF THE DRAWINGS

The invention will be explained in more detail below with reference to exemplary embodiments. In the drawings:

FIG. 2B shows a schematic illustration of equipotential lines and lines of force through the section of FIG. 2A; and FIG. 2C shows a profile of electrical potential along the section of FIG. 2A in a longitudinal direction.

DETAILED DESCRIPTION OF INVENTION

The examples represent preferred embodiments of the invention.

Figure 2A:
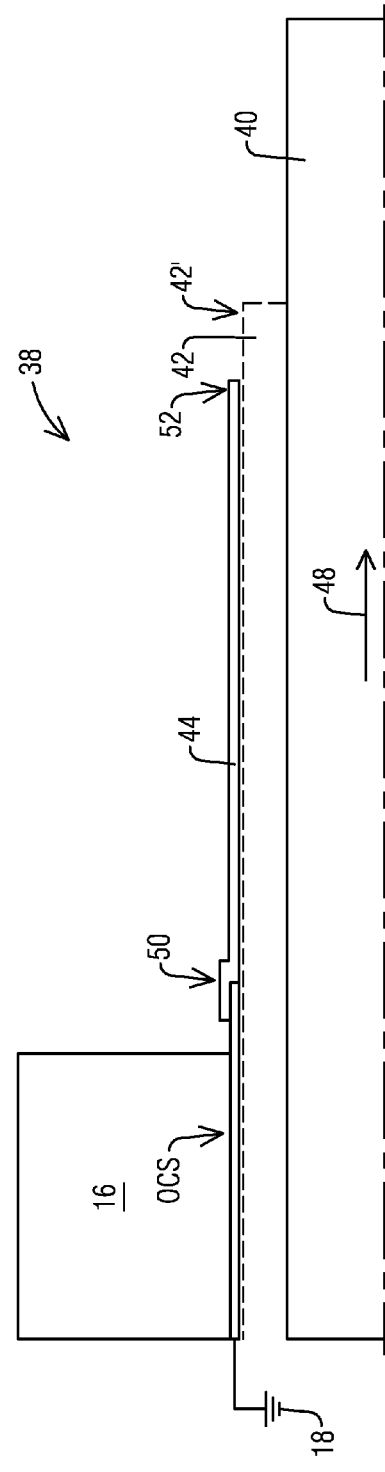
FIG. 2A shows a schematic illustration of a section through an embodiment of the conducting device according to the invention.

FIG. 2A shows a conducting device 38 comprising an electrically conductive conducting element 40, a sheath 42 surrounding said conducting element regionally and end corona shielding arranged on the sheath 42 in the form of a layer 44. The conducting element 40 can be, for example, a bar comprising copper or aluminum or a wire comprising these materials. The sheath 42 can be electrical insulation comprising a polymer or mica. The layer 44 can in this case be a single-ply layer. It comprises a material with a locationally dependent resistivity.

With respect to a ground potential 18, an electrical AC voltage is produced in the conducting element 40 which can have, for example, a frequency of 50 Hz and an rms value of above 5 kV. Owing to the inhomogeneously distributed resistivity of the layer 44, field control is effected. As a result, FIG. 2B depicts that equipotential lines 46 of an electrical field surrounding the conducting element 40 are deformed in comparison with the equipotential lines 24 (see FIG. 1B). As a result, the potential drops from an outer end 42' of the sheath 42 from 100% of the potential of the conducting element 40, in the opposite direction to a direction of extent 48 of the layer 44, to the ground potential 18 at an edge 50 of the layer 44, which edge is remote from the end 42' of the sheath 42. The edge 50 is connected to outer corona shielding OCS, which is connected to the ground potential 18. A resistance of the outer corona shielding OCS is so low that the edge 50 is kept at the ground potential 18 via the outer corona shielding OCS.

The resistivity of the material of the layer 44 increases from the edge 50 in the direction of extent 48 up to the edge 52 facing the end 42' of the sheath 42 in accordance with a continuously differentiable function. A length 54 of the layer 44 along the direction of extent 48 can be between 15 cm and 25 cm in the example shown.

FIG. 2C shows a potential profile 60 as results on the outer surface of the conducting device 10, i.e. the arrangement comprising the conducting element 40 of the sheath 52, the layer 44 and the outer corona shielding OCS. By virtue of the outer corona shielding OCS being coupled to the ground potential 18, a potential which corresponds to the ground potential 18, i.e. 0% of the potential of the conducting element 40, results at the surface of said outer corona shielding. Starting from the edge 50 of the layer 44, the potential increases virtually linearly along the direction of extent 48 of the layer 44 up to the value of 100% of the potential of the conducting element 40 at the edge 52 of the layer 44. Correspondingly, the voltage of the conducting element 40 at the surface of the layer 44 decreases over the entire length 54 of said layer. The potential drop is in this case very uniform at the surface of the layer 44 as a result of the selected profile for the locationally dependent resistivity of the layer 44. Therefore, at the surface of the layer 44, the electrical field has lines of force 56 which have tangential components 58 with virtually the same magnitude along the direction of extent 48 of the layer 44. There is therefore no local excess increase in field intensity resulting along the layer 44, by means of which a partial discharge could be caused.

Figure 1A:
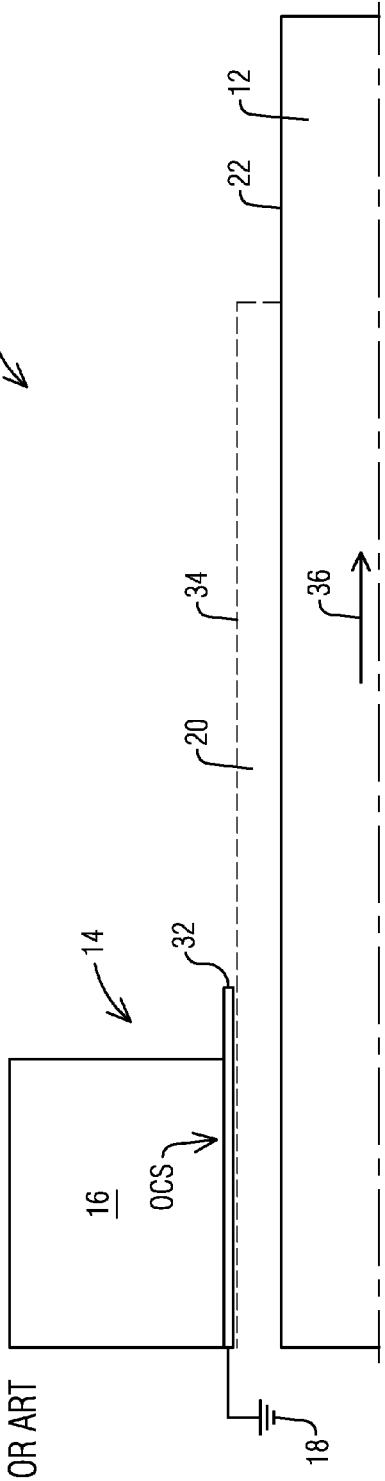
FIG. 1A shows a schematic illustration of a section through a generator stator winding comprising main insulation without end corona shielding.
Figure 1B:
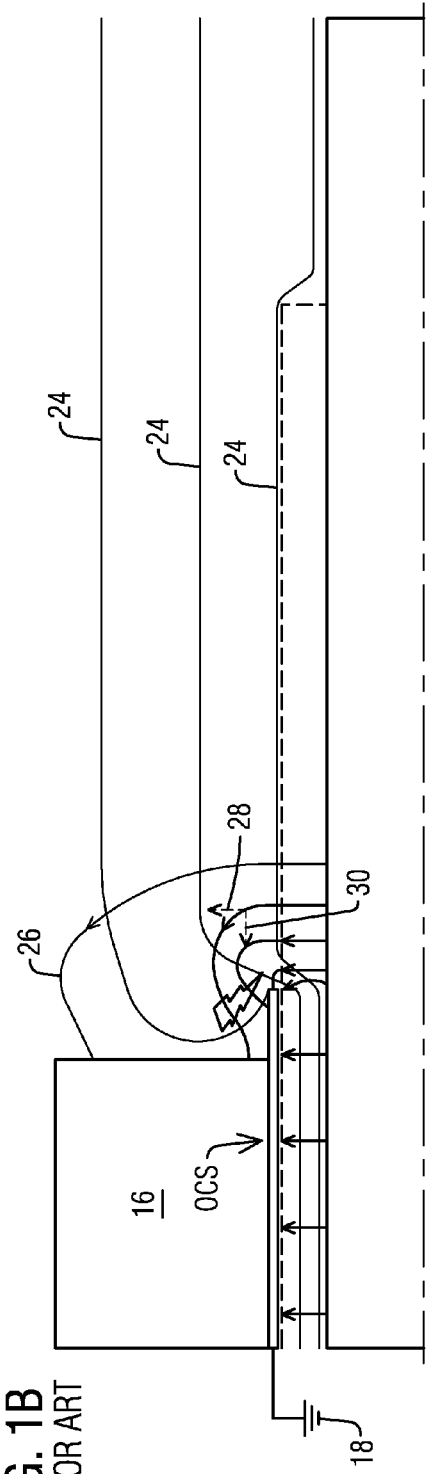
FIG. 1B shows a schematic illustration of equipotential lines and lines of force through the section of FIG. 1A.
Figure 1C:
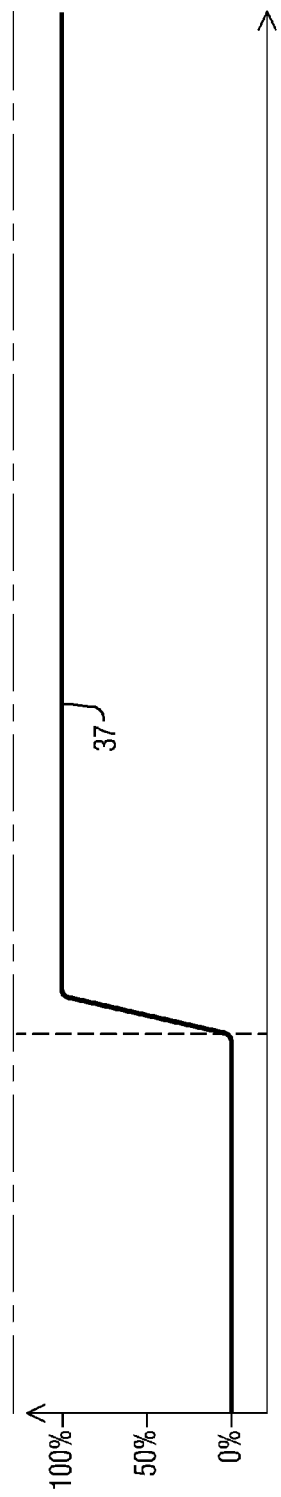
FIG. 1C shows a profile of electrical potential along the section of FIG. 1A in a longitudinal direction.

In comparison with the situation shown in FIG. 1A, owing to the layer 44 in the case of the conducting device 38 shown in FIG. 2A, the tangential potential decrease along the surface of the insulating material is uniform. Ideally, it is linearized. This is achieved by virtue of always the same voltage magnitude dropping over the layer 44 per unit length along the direction of extent 48. For this, a locationally dependent and voltage-dependent resistance per unit length is provided by the layer 44 in the axial direction of the conducting element 40, i.e. in the direction of extent 48 of the layer 44. FIG. 2A shows a conducting device 38 comprising an electrically conductive conducting element 40, a sheath 42 surrounding said conducting element regionally and end corona shielding arranged on the sheath 42 in the form of a layer 44. The conducting element 40 can be, for example, a bar comprising copper or aluminum or a wire comprising these materials. The sheath 42 can be electrical insulation comprising a polymer or mica. The layer 44 can in this case be a single-ply layer. It comprises a material with a locationally dependent resistivity.

The layer 44 has been produced from two enamels with particles having different partial conductivity. The first enamel contains partially conductive particles with which the highest resistance per unit length in the layer 44 can be produced. The layer 44 has the highest resistance per unit length at the edge 52. The second enamel contains partially conductive particles which can represent the lowest resistance per unit length in the layer. The layer 44 at its edge 50 has the lowest resistance per unit length.

The two enamels could be processed in the same way since the particles of the two partially conductive fillers, i.e. the particles of both particle sorts, in the enamels have the same geometric dimensions and the same chemical surfaces and the same densities. The two enamels can have been produced, for example, on the basis of the method which is described in the document EP 2 362 399 A1. The layer 44 has been applied to the sheath 42 by means of being sprayed on, wherein the enamel with the low-resistance filler has been sprayed on at the transition between the outer corona shielding OCS and the layer 44 and then the concentration of the low-resistance filler has been reduced gradually in the direction of extent 48 over the length 54 of the layer 44 up to the edge 52. At the same time, the concentration of the high-resistance filler in the layer 44 was increased starting from the edge 50 up to the edge 52 during spraying of the enamel. As a result, the resultant end corona shielding resistance per unit length of the layer 44 increases continuously over the entire length 54 without there being any sudden changes in resistance. Correspondingly, no sudden changes in potential along the direction of extent 48 in the layer 44 result in the potential profile 60 either.

Spraying the layer 44 on can be performed using two methods. Firstly, two spray nozzles can be used, of which in each case one sprays one of the two enamels. At the transition to the outer corona shielding OCS, the spray nozzle with the enamel which contains the low-resistance particles is operated with a spray intensity of 100%, while the second spray nozzle, which is arranged parallel thereto and can spray the enamel with the high-resistance filler, is operated with a spray intensity of 0%. As the nozzle arrangement comprising the two spray nozzles moves along the direction of extent 48, the spray intensity of the spray nozzle with the low-resistance filler is reduced and at the same time the spray intensity of the spray nozzle with the high-resistance filler is increased. When the edge 52 is reached, the spray nozzle with the high-resistance filler is operated with a spray intensity of 100% while the spray nozzle with the low-resistance filler is operated with a spray intensity of 0%.

It is also possible to use only one spray nozzle and to feed the two partially conductive enamels in each case in spatially resolving fashion to the spray nozzle. In this case, the two partially conductive enamels are mixed directly before the spray nozzle in such a way that, at the transition of the outer corona shielding OCS to the end corona shielding, 100% low-resistance enamel is sprayed and, at the opposite end of the layer 44, at the edge 52, 100% high-resistance enamel is sprayed.

By means of the two application methods described, end corona shielding in the form of the layer 44 can be provided which has a locationally defined resistance per unit length and at the same time continuous transitions from the end corona shielding start at the edge 50 up to the end corona shielding end at the edge 52. Thus, it is possible to ensure that there is no sudden change in resistance over the end corona shielding length 54 and thus no sudden change in potential either. Otherwise, partial discharges would occur as a result of a sudden change in potential, and these partial discharges are now avoided, as a result of which the entire end corona shielding construction demonstrates a marked increase in dielectric strength.

By virtue of the end corona shielding in the form of the layer 44 being in the form of a single-ply layer, a further advantage results. The more plies in a partially conductive layer are painted on, the thicker the end corona shielding. Correspondingly, less heat can be dissipated from the conducting element 40 to the surrounding environment at the same time. Since end corona shielding can be heated (temporarily up to 180° C.), it is highly advantageous to dissipate the heat arising as quickly as possible in order to avoid degradation of the end corona shielding. Since the conducting device 38 only requires a single end corona shielding layer 44, particularly effective heat dissipation is ensured in comparison with the prior art.

Overall, it has been demonstrated how the application of a single-ply end corona shielding layer can be achieved in accordance with the invention by using two enamel application nozzles each having a high-resistance partially conductive enamel reservoir and a low-resistance partially conductive enamel reservoir, wherein the spray intensity of a nozzle is changed in a manner which is indirectly proportional to the spray intensity of the other nozzle, while the nozzle arrangement is moved over the sheath 42. This results in a locationally dependent mixing ratio. A further possible application method includes using a single spray nozzle with an in-situ mixer, which in turn mixes the high-resistance partially conductive enamel with the low-resistance partially conductive enamel, i.e. the mixing ratio is adjusted depending on a position of the spray nozzle over the sheath 42.

The invention claimed is:

1. An electrical conducting device comprising
an electrically conductive conducting element and
an electrically insulating sheath surrounding said conducting element at least regionally, with a coating comprising a material which has a resistivity which increases towards one end of the sheath is arranged on an outer side of said sheath.

2. The conducting device as claimed in claim 1, wherein the resistivity increases towards one end in accordance with a continuously differential function.

3. The conducting device as claimed in claim 1, wherein
the material of the coating comprises particles with a first electrical conductivity and particles with a lower second electrical conductivity, and
the increase in the resistivity towards the end of the sheath is effected by a decrease in concentration of the particles with the first conductivity and an increase in concentration of the particles with the second conductivity.

4. The conducting device as claimed in claim 1, wherein
the material of the coating comprises an electrically insulating substance, wherein, by means of the substance, a matrix is formed in which electrically conductive particles are arranged.

5. The conducting device as claimed in claim 1, wherein
the material of the coating comprises electrically conductive particles with different electrical conductivity, wherein the particles have the same shape and/or have the same chemical constituents.

6. The conducting device as claimed in claim 1, wherein
the material of the coating has electrically conductive particles which are each formed from a base body, which has a layer comprising a doped metal oxide.

7. The conducting device as claimed in claim 1, wherein, in the case of the material of the coating, a particle-to-mass concentration is constant.

8. The conducting device as claimed in claim 1, wherein
the material of the coating has electrically conductive particles with a flattened shape.

9. The conducting device as claimed in claim 1, wherein
a sheet resistance of the coating at a rim of the coating remote from the end of the sheath is 10000 ohms, and a rim facing the end has a resistivity which corresponds to the resistivity of a material of the sheath.

10. The conducting device as claimed in claim 1, wherein the coating is formed from a single-ply layer.

11. An end corona shielding arrangement for an electrical conducting device, comprising
 a layer which extends areally along a direction of extent and has a resistivity which increases along the direction of extent in accordance with a monotonically increasing function.

12. A method for producing an end corona shielding for an electrically insulating sheath of an electrical conducting device, comprising:
 providing particles at least of one sort, wherein the particles of one sort have an identical predetermined electrical conductivity;
 producing a spray jet consisting of an enamel and the particles by a nozzle arrangement,
 moving the nozzle arrangement along a surface of the sheath;
 during the movement of the nozzle arrangement, changing a concentration of the particles of at least one sort in the spray jet.

13. The method as claimed in claim 12, wherein
 a first sort of particles and a first proportion of the enamel are provided as a first suspension and a second sort of particles and a second proportion of the enamel are provided as a second suspension, and the two suspensions are mixed by two separate nozzles of the nozzle arrangement in the spray jet and/or on the sheath.

14. The method as claimed in claim 12, wherein
 at least two different particle/enamel suspensions are mixed in a common nozzle of the nozzle arrangement.

15. The method as claimed in claim 12, wherein the nozzle arrangement is moved by a robot.

16. The conducting device as claimed in claim 1, wherein the resistivity increases towards one end in accordance with a continuously differential function comprising a straight line from an initial value to a final value.

17. The conducting device as claimed in claim 1, wherein the material of the coating comprises an electrically insulating substance comprising a polymer, wherein, by means of the substance, a matrix is formed in which electrically conductive particles are arranged.

18. The conducting device as claimed in claim 1, wherein the material of the coating comprises an electrically insulating substance comprising a synthetic resin or enamel, wherein, by means of the substance, a matrix is formed in which electrically conductive particles are arranged.

19. The conducting device as claimed in claim 1, wherein the material of the coating has electrically conductive particles which are each formed from a base body comprising mica, which has a layer comprising a doped metal oxide.

* * * * *